United States Patent [19]
Potts

[11] Patent Number: 6,018,909
[45] Date of Patent: Feb. 1, 2000

[54] SUBSURFACE SOIL CONDITIONING

[76] Inventor: David A Potts, 385 Roast Meat Hill, Killingworth, Conn. 06419

[21] Appl. No.: 08/864,634

[22] Filed: May 28, 1997

Related U.S. Application Data

[60] Provisional application No. 60/018,418, May 28, 1996.
[51] Int. Cl.$^7$ ........................................ A01C 1/06
[52] U.S. Cl. ...................... 47/58.1; 47/1.01 F; 73/864.74; 73/23.2; 175/40
[58] Field of Search ................................ 47/58.1, 1.01 F; 73/864.74, 23.2; 75/40

[56] References Cited

U.S. PATENT DOCUMENTS

| | | |
|---|---|---|
| 1,862,339 | 2/1932 | Highmark . |
| 2,127,175 | 8/1938 | Imbertson et al. ............................ 61/13 |
| 3,068,616 | 12/1962 | Shibata et al. ................................. 47/1 |
| 4,261,203 | 4/1981 | Snyder ..................................... 73/421.5 |
| 4,335,622 | 6/1982 | Bartz ..................................... 73/864.74 |
| 4,807,707 | 2/1989 | Handley et al. . |
| 5,115,750 | 5/1992 | White et al. ............................. 111/118 |
| 5,150,622 | 9/1992 | Vollweiler . |
| 5,219,243 | 6/1993 | McCoy ..................................... 405/43 |
| 5,433,759 | 7/1995 | Benson ..................................... 47/1.01 |
| 5,507,595 | 4/1996 | Benson ..................................... 405/43 |
| 5,542,208 | 8/1996 | Benson ..................................... 47/1.01 |

OTHER PUBLICATIONS

"Air & Water Through Soil" Brochure, 4 Pages Subair, Inc Nov. 1996.
"Sportfield Systems", Brochure, 4 Pages, Subair, Inc Nov. 1996.

*Primary Examiner*—Leon B. Lankford, Jr.
*Attorney, Agent, or Firm*—C. G. Nessler

[57] ABSTRACT

Soil profiles of sports fields, such as those in stadiums and golf courses, are treated by injecting or suctioning gases and water by means of buried horizontal pipe arrays or by vertical penetrators. The extent of soil treatment is controlled by measurement of subsurface gas composition and pressure at locations remote from the point of gas injection or removal, preferably by using a special probe. Penetrators and probes form seals within shaped holes in the soil profile, to control the depth of the layer at which gas is exchanged, and to inhibit atmospheric air flow vertically along the bodies of the devices. For example, a conical penetrator section forms a seal within the hole by compacting the shoulder of a stepped hole and it forms a second seal at the surface of the soil by means of a plate and gasket. In other penetrator installations, a radially expansible material forms the seal. Penetrators of one or two part construction may be removably installed in fields, to facilitate re-treatment. Vertical penetrators are also permanently installed and connected by an subterranean pipe array.

25 Claims, 8 Drawing Sheets

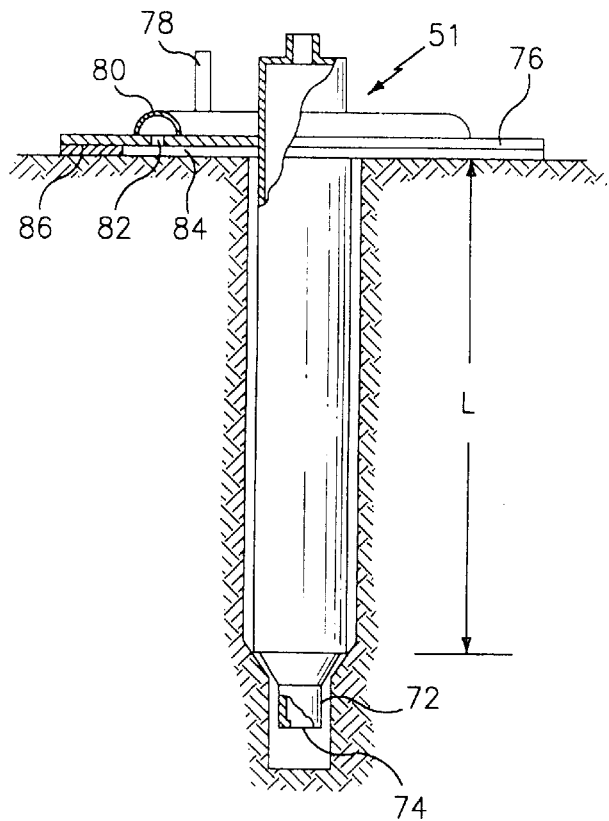
FIG. 8
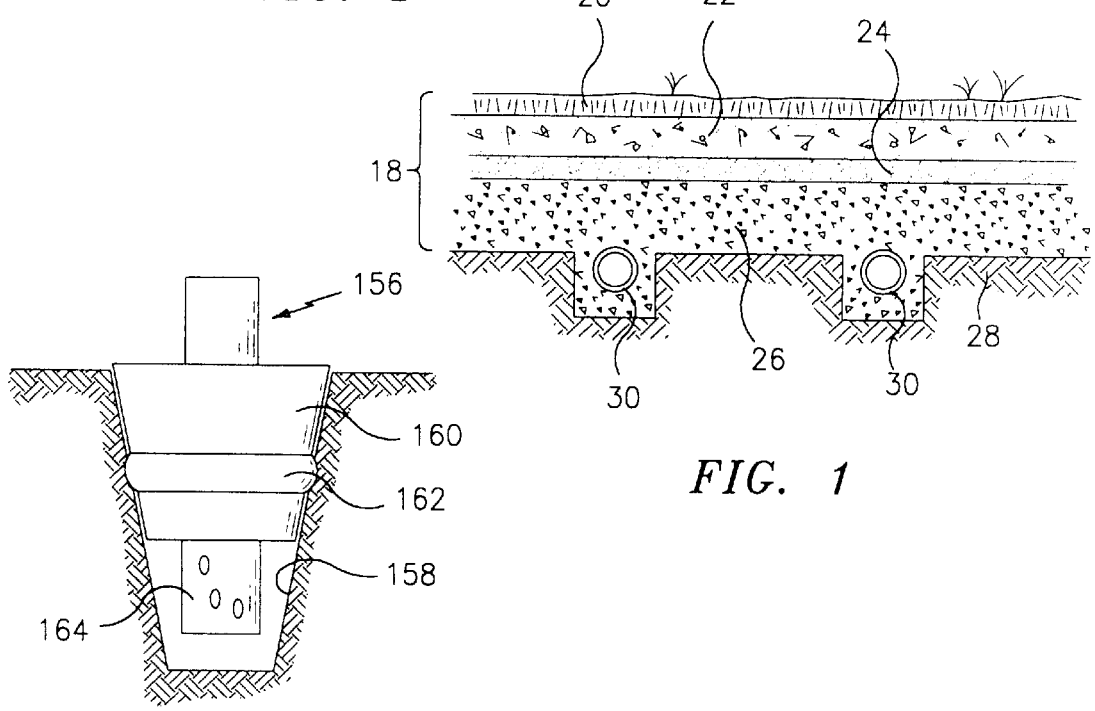
FIG. 18
FIG. 1

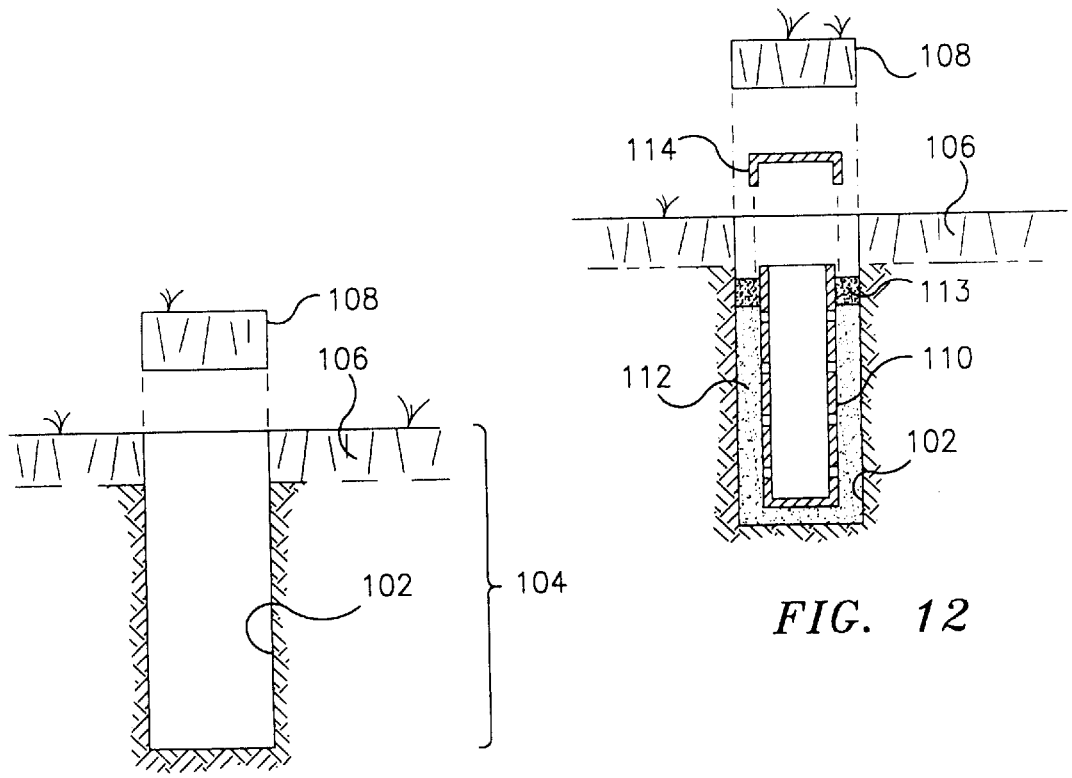
FIG. 11
FIG. 12
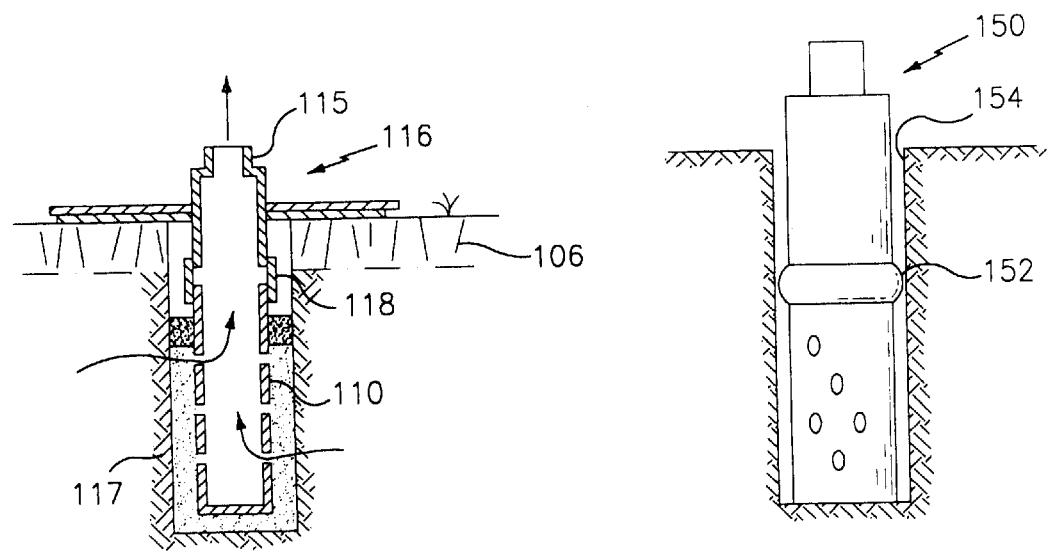
FIG. 13
FIG. 17

SUBSURFACE SOIL CONDITIONING

This application claims benefit of Provisional application Ser. No. 60/018,418, filed May 28, 1996.

TECHNICAL FIELD

The present invention relates to the treatment of soil of the earth for promoting growth of plant life.

BACKGROUND

There is much commercial interest in promoting good vegetation growth on sports grass surfaces, such as stadium fields, golf greens, and the like. For such surfaces, the grass covering must be kept dense and uniform, while at the same time, the surface is closely cropped and subject to continuing traffic. These factors mean that it is imperative to obtain optimal growing conditions in the root zone. Principles employed in such specialized uses can also be applicable to improving the growth of plant products in other situations.

It is well recognized that plant life is dependent upon the character of the soil surrounding the roots. With particular reference to sports grass fields and golf greens, it has become increasingly recognized that it is advantageous to carefully control subsurface conditions, such as soil composition, morphology (structure), aeration, and moisture content. Sports grass surfaces are preferably constructed in layers using sand, gravel and organic matter to obtain optimal morphology, drainage and retention of moisture.

Air and moisture control has been sought by various means. In one simple widely used procedure, small (one-half inch diameter) holes are created in the surface of the field, by drilling or punching with a machine. While simple, this process is relatively inefficient since air and moisture exchange only take place by slow diffusion in the soil and by convection of gases from the small hole, and there is little driving force.

A better way of facilitating air and moisture exchange is by forced injection or withdrawal of gases. This is typically accomplished by a mechanical system involving air moving machinery connected to an array of subsurface pipes installed as an adjunct to a permeable layer of the soil profile. For instance, U.S. Pat. No. 5,433,759 to Benson describes a ventilating system wherein a vacuum or air pressure is applied to the piping system, to thereby affect the conditions in the layered soil and turf. However, results obtained will vary according to the morphology of the soil, and the starting gas and moisture conditions. In practice, air has been periodically injected or withdrawn from the subsurface piping system according to the subjective judgment of the user of the system.

Since there has been no particular mechanism or systematic way for measuring the shallow-depth soil constituents which are biologically important, the tendency heretofore has been simply to aerate or withdraw moisture from the soil whenever it appeared plant health was visibly suffering, or it "seemed right". This approach has led to beneficial results, and the use of air induction systems is spreading. However, engineering and biological intuition tells one that better management of the extent of ventilation might be achievable, to increase the desired benefits.

In other agricultural activities, technical devices have been applied to obtain good results. For plant irrigation, automatic watering control has been achieved by measuring the electrical resistivity of the soil to determine when to irrigate. See U.S. Pat. No. 2,768,028 to Robinson and No. 3,024,372 to Seele. Various probes have been used for sensing soil gas, in connection with exploration for hydrocarbons, or finding fuel leaks. Generally, these probes are hollow tubes having pointed ends for manual driving into the soil. See for instance, U.S. Pat. No. 5,150,622 to Vollweiler. However, prior gas probes are designed for comparatively deep sampling. In contrast, grasses typically have roots of less than 12 inch depth and thus the critical conditions are in that vicinity. Accurate sampling of gases near the surface is complicated by the tendency for infiltration of atmosphere into the gas sample, and thus erroneous measurement.

SUMMARY

An object of the invention is to systematically control the manner of treating soil wherein air is drawn into the soil; more particularly, to beneficially control the change in character of the soil profile over time. Another object is to provide a means for repetitively treating soil profile character, including gas composition, moisture content, and physical composition, in soil profiles where no subsurface pipe array exists.

In accord with the invention, the composition of soil gas at a location, spaced apart from the point at which air is removed or injected, is measured and used to control operation of the apparatus which creates the pressure differential in the soil. In further accord, soil gas pressure and composition change are used to determine multiple locations where air ought be injected or removed on a field. In one embodiment, for a sports field which has no subsurface piping array, a penetrator connected to a blower is inserted downwardly into a hole in the surface of the soil profile. Then either suction or pressure is applied to the penetrator, and thus to a permeable subsurface soil layer, to thereby change its character and that of the soil profile lying above, by inducing gas flow to or from the atmosphere at the surface of the soil surrounding the penetrator.

In further accord with the invention, a penetrator has generally the form of a hollow tube and makes a compaction seal with the sidewall of a shaped hole into which it is inserted. Preferably, a penetrator has an upper body, a smaller diameter lower body with perforations, and a seal section, such as a conical section. When inserted downwardly into a prepared shaped hole, e.g, one having a shoulder, the seal section compacts the soil at a point along the hole sidewall, to form a gas seal which inhibits airflow along the penetrator body and thus determines the depth below which gas will be removed or inserted into the soil. Preferably, the penetrator also makes a further seal with the surface of the soil at the top of the hole by means comprising a plate extending radially from the upper body, with a soft gasket thereunder.

In a preferred embodiment, when air is flowed to or from the penetrator, gas flows laterally in the soil and thence to or from the surface of the field remote from the penetrator. The radial effect of a penetrator is extended further with a plastic or water membrane laid on the soil surface. With a preferred penetrator, pressure p varies with radial distance d within the soil according to the general relationship $p=ce^{md}$. Mostly, penetrators are used with suction. Alternatively, penetrators may be used with pulsing pressure, and to inject sand particulate, to increase the permeability of a layer in the soil.

In one embodiment, the penetrator is removed after treating the soil and the field is restored in a way which facilitates re-treatment. This is facilitated by a two part penetrator. A lower part is inserted permanently in a hole which is then covered over with a turf plug. When soil treatment is needed, the turf plug is removed and a second upper part is used to connect the lower part to a blower. In another embodiment, a vertical penetrator is permanently installed and connected to a blower by horizontal piping running beneath the soil surface to a blower. In permanently installed penetrators, bentonite or other expansible material is preferably used to form the airseal with the sidewall of the shaped hole.

To measure the composition or pressure within the soil profile, a gas probe is inserted into the surface of the soil. A preferred probe is smaller than, but configured and used similarly to, preferred suction penetrators. The probe has single or double seals, to provide accurate measurement of soil gas composition near the soil surface.

The process of the invention enables better control of soil moisture and gas conditions, and the efficient use of machinery and labor, in all kinds of soil profile treatment procedures. The process and apparatus of the invention enables beneficial treatment of a variety of soil profiles, particularly those which have not been engineered with pipe arrays or a carefully layered construction.

The foregoing and other objects, features and advantages of the invention will become more apparent from the following description of the best mode of the invention and accompanying drawings.

BRIEF DESCRIPTION OF THE DRAWINGS

FIG. 1 schematically shows a soil profile.

FIG. 8 shows a preferred vertical pressure penetrator inserted in a hole.

FIG. 11, 12, and 13 show the use of a two part vertical penetrator. FIG. 11 shows the hole preparation. FIG. 12 shows how the lower body part is installed and how a cap and plug install when the penetrator is not in use.

FIG. 13 shows how the upper body part is connected to the lower body part.

FIG. 17 shows a penetrator having a cuff seal installed in a hole.

FIG. 18 shows a penetrator which fits in a tapered hole.

DESCRIPTION

Figure 2:
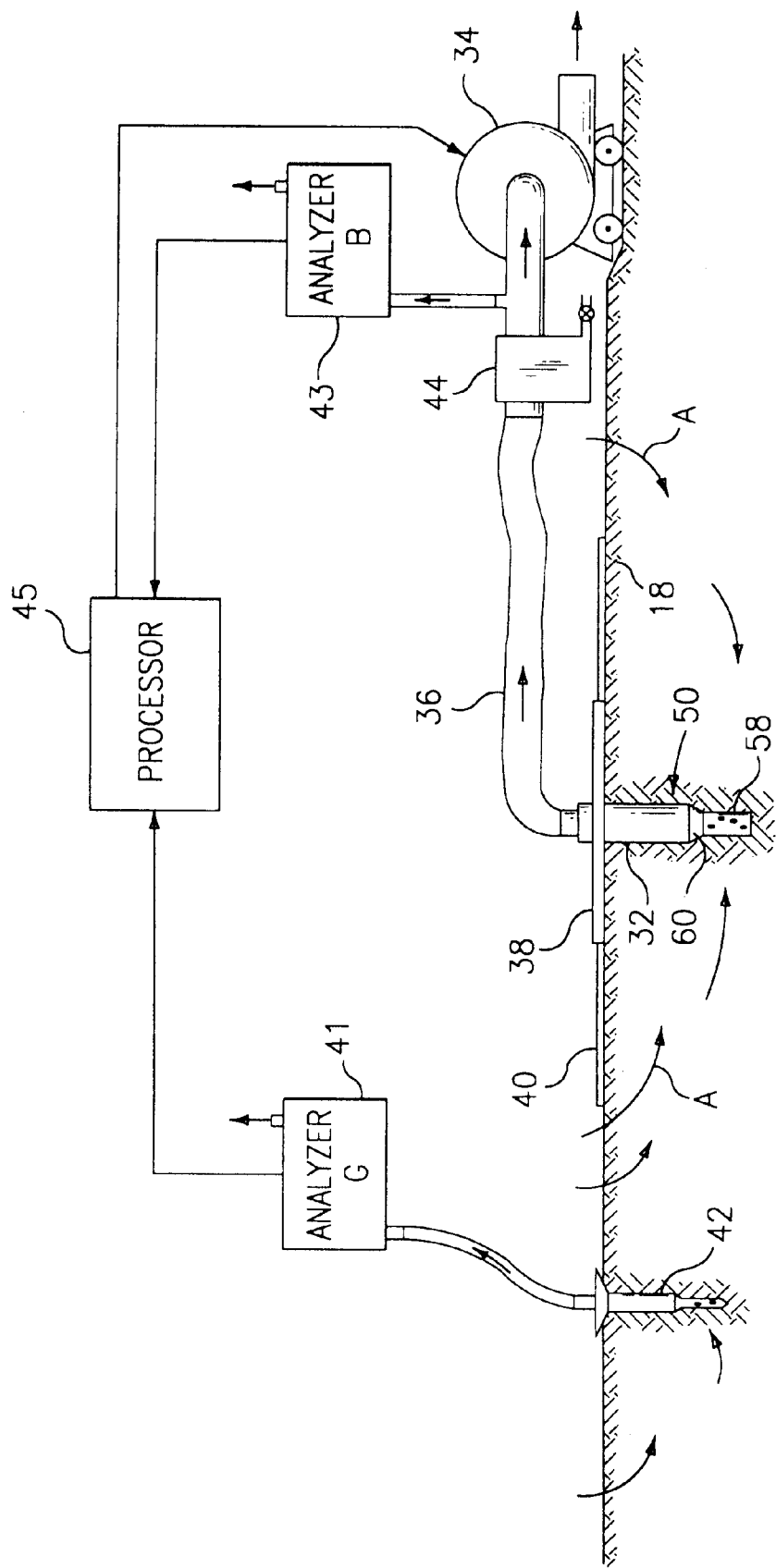
FIG. 2 is a schematic elevation cross section showing components of a system for removing gas from a soil profile at a suction penetrator.

The present invention is particularly useful for treating grass playing surfaces, such as those employed in sports stadium fields and on golf courses. It will be appreciated that the invention is useful for other situations where vegetation is grown for ornamental, food or other uses, in controlled atmospheres or in open spaces. The present invention may be used in combination with various kinds of systems for controlling the character of the soil profile, e.g., moisture content, gas content, and temperature. In particular, the present invention is useful in combination with the type of underground systems for treating soil which are described in U.S. Pat. No. 5,219,243 to McCoy, U.S. Pat. Nos. 5,433,759, 5,507,595 and 5,636,473, all to Benson. The disclosures of the foregoing documents are hereby incorporated by reference. Generally, Benson and other prior art patents describe how to treat the soil profile by applying pressure or vacuum to piping beneath the surface of turf grass.

Heretofore, the technology relating to the Benson patents has been employed so air flow through the soil profile will change moisture content and temperature. In the context of the present invention, it is now understood that it is important to additionally control gas constituents in the subsoil, such as the amounts of oxygen, carbon dioxide, methane and hydrogen sulfide. It is found that when such gases and water vapor are controlled, there is enhanced root system development, better growth, better resistance to disease, etc.

FIG. 1 schematically shows the morphology of soil profile 18 of a golf putting green. It is representative of the vertical cross section of an engineered grass field, such as might be constructed to accord with the United States Golf Association (USGA) standards. The top layer 20, or horizon, comprises the grass playing surface, or turf. This surface may have a dense matted region, or thatch, which is resistive to penetration of air and water. Typically, the turf rests on a layer 22 of mixed sand and organic matter, typically about 12 inch thick, beneath which is a layer 24 of coarse sand, beneath which is a layer of permeable gravel 26, beneath which is the native subsoil 28. An array of air or drainage pipes 30 optionally run in trenches at the bottom of gravel layer 26. According to the prior art, the porous layer 26, and array of pipes 30 in close communication therewith, provide a location, underlying the layers of upper part of the soil profile, for injecting air or suctioning air through the soil, for removing water, and for changing temperature. There are analogous mechanical configurations used in other applications than golf playing surfaces. Examples of such are: channels which run beneath large movable molded plastic containers that contain turf covered soil and which are abutted to form the athletic field; and; flower boxes having molded plastic spacers to create a drain space.

In many instances the soil profile, less ideal than stipulated by the USGA, comprises an approximation wherein the top layer of turf lies on top of a comparatively more air permeable soil layer. The invention is described as it primarily applies to such various types of soil profiles. Usually, the soil profiles treated with use of the invention will have a horizontal soil permeability per unit length per unit area which is greater than the vertical permeability.

Figure 3:
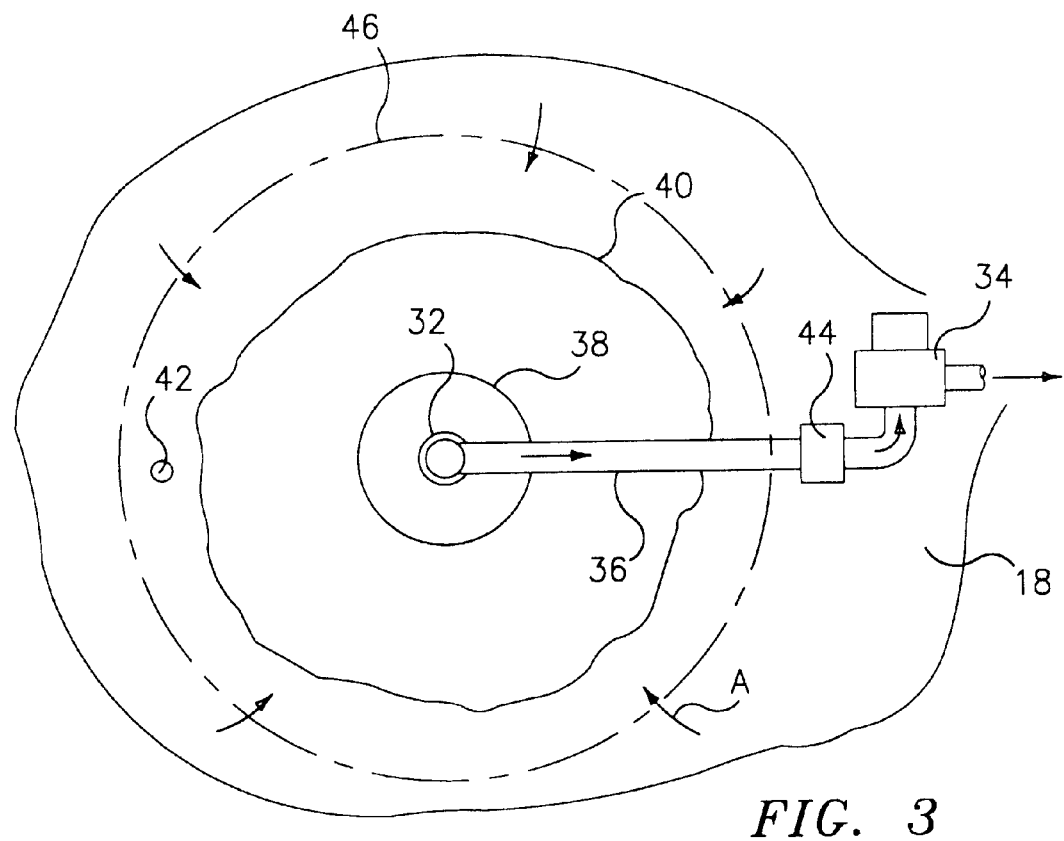
FIG. 3 is a top view of a portion of FIG. 2, showing how a penetrator affects the soil at remote locations.
Figure 4:
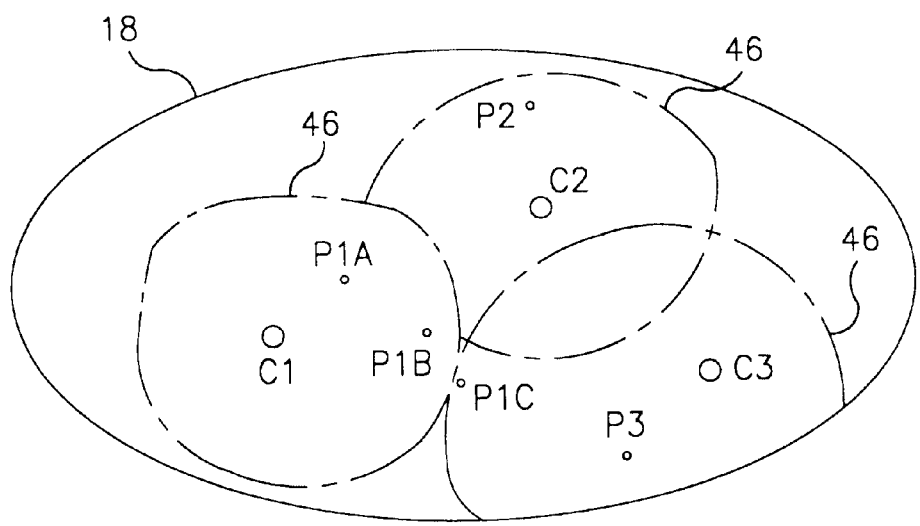
FIG. 4 is a top view similar to FIG. 3, showing the effects of multiple penetrators.

Reference should be had to the schematic elevation cross section shown in FIG. 2, the FIG. 3 schematic plan view of some of the FIG. 2 components, and the flow chart of FIG. 4, to understand how the present invention is used in treating a typical sports field. A penetrator 32 is inserted into a hole formed in the surface of the soil by a suitable digging or boring tool. The suction side of blower 34 is connected by flexible pipe 36 to the penetrator, to thereby create in the penetrator a negative pressure, typically 27–270 inch water column relative to atmosphere, which draws soil gases into the penetrator. The negative pressure thus created in the permeable subsurface layer of the soil draws atmosphere air horizontally toward the penetrator, which in turn induces downward air flow through the soil surface, as indicated by arrows in FIGS. 2 and 3. Air is prevented from being drawn vertically down around the preferred penetrator by a combination of seals, one at the integral sealing plate 38 and the other at conical body taper 66, as described below.

Surrounding the plate 38 is an optional membrane 40, for example, 0.006 inch thick polyethylene plastic sheet. The sheet increases the degree to which air is drawn through the soil surface at distances substantially removed from the penetrator, when the top soil layer is very permeable in the vertical direction. The same result may be sometimes obtained by spreading a layer of water as a membrane on the surface, where the character of the turf allows. More often, a membrane or the like is not needed to make the treatment zone large. This is especially the case where the invention is applied to a field which has been used or cared for in a manner which compacts the layer near the turf surface, and makes the profile less permeable vertically, compared to horizontally.

To protect the internal parts of the blower, gas flowing to the blower is passed through a centrifugal type separator 44, so the water is separated from the gas. Preferably, when 20–50 inch water column negative or positive pressure is required, the blower is a portable gasoline engine driven machine, such as a commercial Model GT25 radial impeller unit, having a capacity of about 1200 SCFM at 50 inch water column (SubAir, Inc., Deep River, Conn.). When the soil profile character or desired type of treatment requires higher pressures or vacuum, an air moving machine of the rotary vane, rotary lobe or regenerative type is preferred. Within the generality of the description here, the term blower is intended to comprehend all the various types of machines for inducing air movement, positive or negative.

Figure 5:
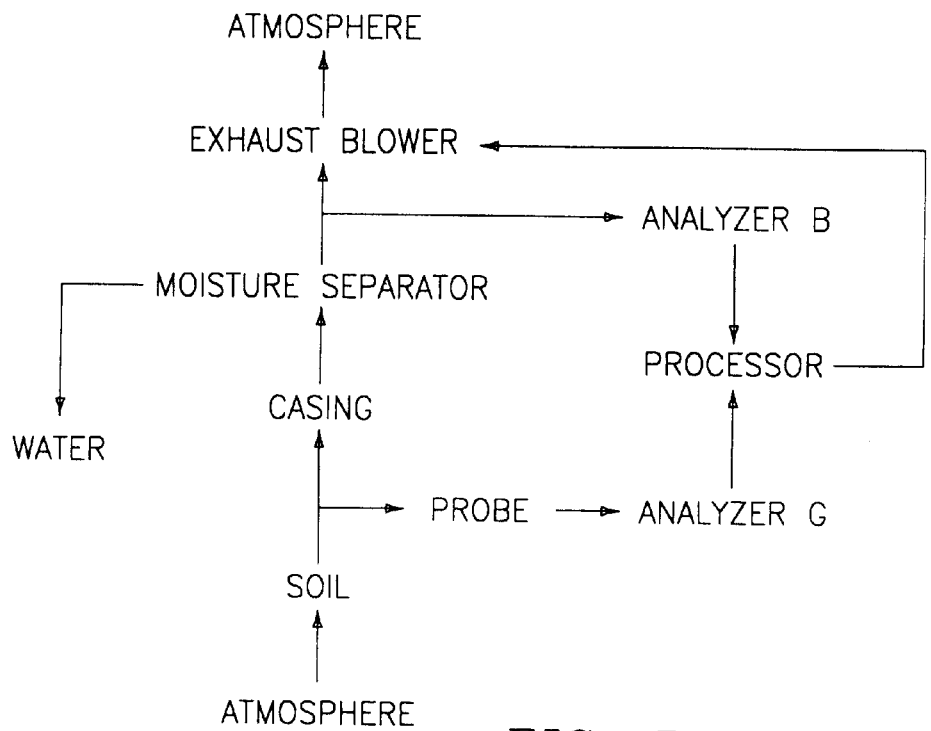
FIG. 5 and FIG. 6 are process flow diagrams.

During operation, the composition of the gas drawn from the soil is measured at the blower inlet, or elsewhere along the suction path, by gas analyzer B. That within the soil is measured by analyzer G through use of probe 42. In one method, a human operator receives the composition data from the analyzers, compares them to a desired reference composition, and continues, ceases, or otherwise modifies blower or other treatment operation. Alternatively, as indicated in FIGS. 2 and 5, analyzers provide output signals to an electronic data processor, programmed to carry out the same analytical and control function.

In typical treatment, after the blower is started, initial reliance is placed on data from Analyzer B. As time passes and Analyzer B shows a desired gas composition is being obtained in the blower line, reliance is placed on data from Analyzer G and probe 42. Analyzer G is used to determine both the radial and depth extent of desired subsurface pressure effect and to confirm that the desired gas composition is being obtained at locations remote from the penetrator. Typically, a blower will be operated in on-off mode, with on-time ranging from minutes to hours. Alternatively, a more sophisticated system may entail variation in the blower speed, amount of additives, etc. An on-off treatment may be repeated with a frequency of from once every number of hours, to once every number of days. The necessary frequency of re-treatment may be determined by taking measurements with a probe during off periods.

Flowing air through the soil profile removes accumulated unwanted gases, and provides more oxygen than otherwise would tend to be present. In addition, suction at the penetrator may be used to remove excess liquid water from the soil and, depending on ambient atmosphere conditions, change the temperature. Additives, such as liquid plant nutrients, may be drawn into the soil by spreading them on the surface, where they become entrained with air drawn into the soil by a negative pressure penetrator.

As an example, an unsatisfactory gas composition in a soil profile, found by probing prior to treatment, could show 3–19% oxygen compared to a desired nominal 21%. (Unless otherwise indicated all gas and vapor percentages are by weight.) Carbon dioxide may exceed 2%, methane 1%, and hydrogen sulfide 0.005% (50 ppm). The process of drawing air through the soil remedies the undesirable gas situation by removing water, to increase the amount of void in which desirable gas, e.g., oxygen and nitrogen, can be contained; by physically exchanging air for the gases present; and, by reacting air/oxygen with constituents of the soil. Within the description here, measurement of gas composition is meant to generally include measurement of the amount of water vapor.

As treatment ensues, Analyzer B will show that the composition of gas at the blower inlet has attained the desired reference composition. The question arises as to how far from the penetrator the soil has been beneficially affected. To determine such, probe 42 is inserted into the profile at one or more points radially removed from the penetrator, to measure the total static gas pressure, along with local gas composition. For instance, measurement will be made of the fraction (partial pressure) of gas constitutents, such as oxygen, carbon dioxide, methane and hydrogen sulfide. A preferred way of measuring composition is by means of a Model GA90 portable infrared gas analyzer (SubAir, Inc., Deep River, Conn.). Gas pressure may be measured by using either a conventional diagphram or manometer type differential pressure gage, connected to probe 42.

When the desired results have been obtained, the penetrator is removed from the hole and the hole is refilled to restore the playing surface. Alternately, an easily removable medium, such as a rigid foamed plastic cylinder, or a porous container filled with compatible soil, may be inserted in the hole and surmounted with a plug of turf at the top, as described in connection with FIGS. 11–13, to enable the hole to be conveniently accessed for subsequent treatment.

Referring to plan view of FIG. 3, there is a nominal peripheral limit, indicated by dashed line 46, beyond which there will be no significant effect of the air moving apparatus on the soil profile. Generally, the peripheral limit 46 defines the edge of the zone beyond which the pressure beneath the soil, measured at a depth where treatment is desired, typically within 12 inch of the surface, will not be lowered by at least about 0.01 inch water column. This 0.01 inch pressure is considered as a somewhat arbitrary limiting value for common soils and turfs, because lesser pressures are associated with flows so low that the time for beneficial effect on soil profile becomes infeasible from the standpoint of equipment and labor utilization. In favorable soil profiles peripheral limits 40 feet radially distant from the penetrator, or zero point, have been measured. See the data in the Examples of Table 1. Use of pressure to define the peripheral limit 46 is a reference, as the final arbiter of benefit is change in gas composition at the limit. Thus, it is possible in atypical situations that higher or lower pressure values than said 0.01 inch pressure may be the critical determinant of significant effect.

The location of limit line 46 varies with soil character and the particular air moving machinery which is used. Thus, to treat a large field, as illustrated in the plan view of FIG. 4, the penetrator is first placed at location C1 and readings are taken at different probe locations P1A, P1B, P1C, etc., which are at different bearings and distances from the C1 zero point, to find the limit points of effective treatment. From one or more such limit points, the location of the limit line 46 may be inferred. After treatment from location C1, the penetrator is moved to location C2, remote from the C1, then to C3, etc. For each penetrator location measurements are made at one or more corresponding probe locations P2, P3, etc. Thus, each penetrator location creates its own effective treatment zone having limit 46. Obviously, the limit 46 of any treatment zone is idealized in the Figures, as the real periphery may likely be irregular and only determinable by use of the probe at multiple locations. With experience, the character of a particular turf grass situation and treatment can be understood with relatively few probe locations, and the necessary number of penetrator locations C1, C2, C3, etc. can be deduced, sometimes with as little as only one probe location measurement. These locations, with temporarily or permanently installed penetrators, may be used in subsequent treatments.

Figure 6:
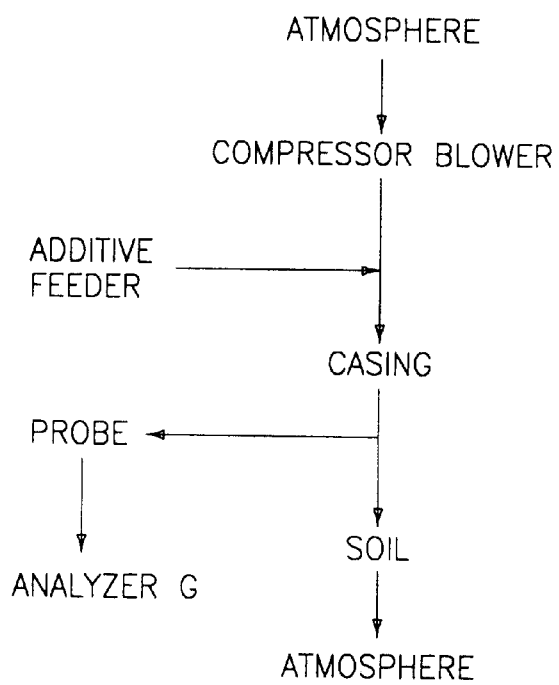

The apparatus of the present invention may alternately be used to inject air and other materials at the penetrator location, as illustrated by the flow diagram of FIG. 6. The artisan will understand how the pressure side of the blower is connected to the penetrator. Downward force, such as from a deadweight or a piece of heavy equipment may be used to hold the penetrator in place against any upward force caused by air being forced into the profile.

Pressure may be applied in one of two modes. First, it may be applied in the range of about 50–300 inch water column, when the lateral permeability of the profile is good. In this mode, the effect on the soil profile gas composition is similar to that obtained when soil gas is drawn into the penetrator. Second, when the effect of the first mode is insufficient, air pressure may be applied in a pulsating manner, preferably for 1–10 cycles at a frequency of about 1–100 pulse per minute, by suitable valving on the penetrator feed line. The pulsating pressure desirably ranges from zero to a peak in the range of 1–20 lb per sq inch (about 28–560 inch water column). The second mode is used when the soil adjacent the penetrator is not particularly permeable, with the aim to uplift somewhat the layer being infiltrated, or otherwise create fissures in the layer. Sand, plastic particles, or other permeable media may be introduced into the air flowing to the penetrator to thereby be deposited in the voids created by the pressurized air flow, to permanently change soil permeability.

Using the pressure method, oxygen in excess of atmosphere can be introduced by connecting an oxygen source to the air pressure supply of a positive pressure penetrator. Other additives, including moisture for irrigation purpose, may be introduced in like fashion.

Figures 7, 10:
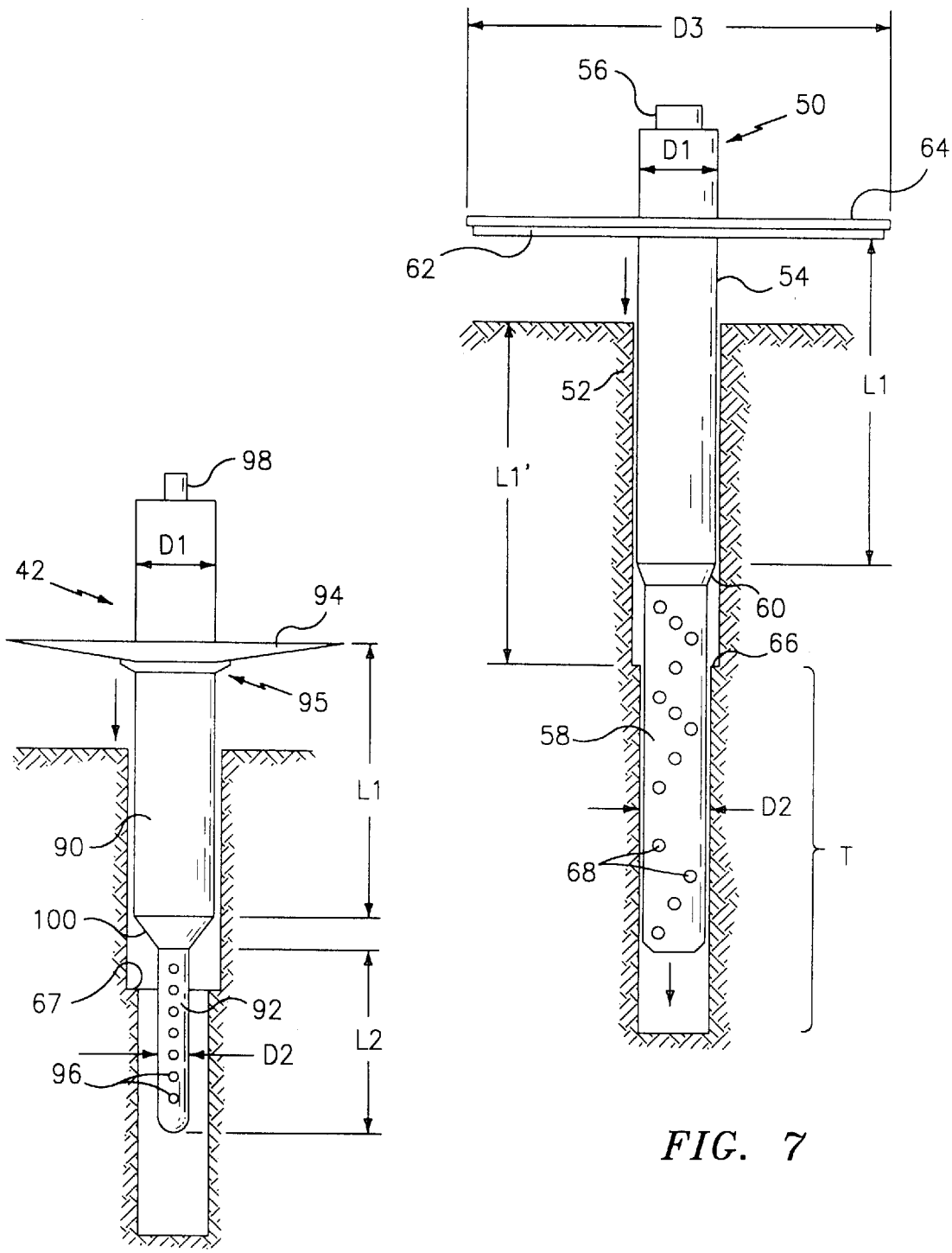
FIG. 7 shows a preferred vertical suction penetrator partially inserted in a hole.
FIG. 10 shows a preferred gas probe.

Preferred removable penetrators are configured particularly for suctioning or for injecting gases within the soil profile. FIG. 7 shows a preferred suction penetrator 50, being inserted into a prepared hole in the soil 52. The hole is cut using known soil coring devices, and as will be illustrated, the lateral dimensions of the upper parts of the hole nominally conform to the lateral dimension of portions of the penetrator body. The hollow penetrator is preferably made of welded steel; alternatively, of plastics. The penetrator body has an upper body portion 54 of length L1 of about 4 to 6 inch, and a diameter D1 of about 4 inch; and, a lower body portion 58 of diameter D2 of about 3 inch diameter and a length of about 12 inch. The conical taper of seal section 60 connects the upper and lower body portions. The penetrator is connectable to the sub-atmospheric pressure pipe running from the blower by means of port 56. Flat plate 64 of about 36 inch diameter extends transversely from the upper body. A soft rubber gasket 62 underlies the plate, to enable good but non-injurious contact with the grass surface.

As illustrated, the hole is stepped, having a first diameter and a second diameter meeting at shoulder 66. The hole diameters are sized to generally correspond with the body diameters D1 and D2 and to enable the body to slip into the hole. The distance L1' to the shoulder 66 from the soil surface is chosen so that upon full insertion of the penetrator the conical seal section 60 hits the shoulder, to deform and compact it, to thereby form an air seal, as shown for the seated penetrator in FIG. 8. Thus, on full insertion, there are two seals created—one by compression at the surface by the hole, by the plate; and, the other by compaction at the penetrator conical section. Both seals inhibit air from moving along the relatively short length of the upper body and upsetting the desired result of obtaining horizontal flow through the soil at a layer deeper down than the elevation of shoulder 66. A multiplicity of passagewarp, round holes 68, along the lower body 58 enable gas to flow into the penetrator interior from the soil surrounding the lower body. The holes are typically covered with screening to prevent soil from entering. Other gas permeable lower body configurations may alteratively be used, as are known in other devices from removing gases and liquids from granular content mediums and the like. Thus, when penetratoris fully in place and operational, it determines the layer T, immediately adjacent the penetrator, from which gas will be drawn. Typically the layer T is at a depth of 6 inches to 9–12 inches from the surface.

In alternative embodiment suction penetrators, the plate 64 may be a flexible structure. For example, it may comprise a component which is a flexible plastic sheet, like that previously described.

FIG. 8 shows a preferred pressure penetrator 51, for use when injecting pressurized air into the soil profile. The penetrator is generally like the penetrator 50, except that the lower body 72 has a relatively short length and a comparatively large open end 74. As mentioned, downward mechanical force is applied to the penetrator to resist the upward thrust of pressurized gas. A compressible material, such as a sponge rubber layer of 0.5 to 6 inch, preferably 2 inch, thickness (not shown) may underlie the plate, to accomodate any upwelling of the soil due to pressurization. Alternately, a vacuum source may be connected to port 78 of manifold 80 which connects by holes 82 to a space 84 under the plate 76 created by peripheral gasket 86, to thereby induce downward atmospheric pressure on the plate. It will also be appreciated that, while inferior, the suction penetrator 50 may also be used for pressurized air delivery, and when screens are removed, even for introduction of sand.

Figure 9:
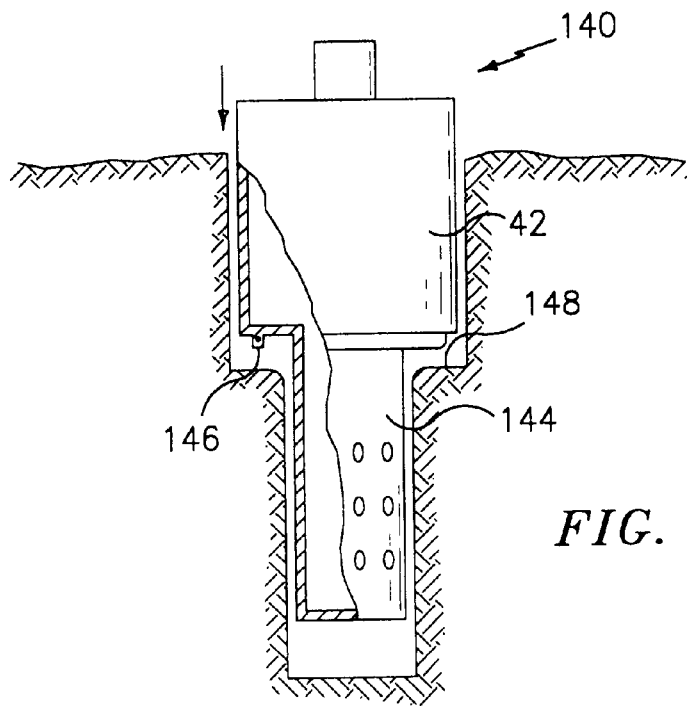
FIG. 9 shows another vertical suction penetrator partially inserted in a hole.

FIG. 9 shows another embodiment of suction penetrator 140 almost fully inserted in a stepped hole, where the vertical air seal within the hole, at the connection between the upper body portion 142 and perforated lower body portion 144, is achieved by a seal section comprised of circumferential ring 146 which, when the pentetrator is seated, imbeds itself in, and compacts, the shoulder 148. While the taper seal section shown in various other Figures is preferred, in the generality of the invention different seal constructions may be substituted. Optionally, to improve seal performanace, bentonite or other like material may be placed onto the surface of the shoulder in the hole; and, a reslient gasket material may be placed around the circumference of penetrator in vicinity of a seal section, e.g., part 60, part 146.

FIG. 17 shows still another embodiment penetrator 150, inserted in a straight hole 154, where the seal section above the perforated part of the penetrator body is formed by an expansible rubber cuff seal 152 fastened to the penetrator body. The cuff seal is expanded after insertion of the penetrator to locally press against the hole sidewall; and, it is relieved before removal. Expansion is accomplished by having a cuff which is a boot that can be pressurized. Alternately, a mechanism may longitudinally compress the cuff to increase its diameter. When the cuff expands radially, it tends to compact the soil at the sidewall of the hole.

Other holes and penetrators than those comprised of straight cylinders may be used within the invention. For instance, as shown in FIG. 18, a penetrator 156 may have a tapered upper body part 160 which fits into tapered hole 158. A raised ring 162 enhances the compaction sealing between the upper body and hole. The dimensions of penetrator and hole are chosen so that the perforated lower body part 164 reaches the desired depth when the penetrator is fully inserted.

FIG. 10 shows a preferred probe 88 for measuring gas composition. The probe shares certain obvious features and functionality with the preferred suction penetrators; and, the variations described for penetrators are in general useful for probes. In the invention claimed, a probe is encompassed within scope of a penetrator, when used in the suction mode. The body of probe 88 is stepped. There is an upper body portion 90 having diameter D1 of about 0.75 inch and length L1 of 4.5 inch, and a lower body portion 92 of diameter D2 of about 0.38 inch and length L2 of about 3 inch. The plate 94 has an outside diameter of about 1.5 inch, and a double tapered underside 95—preferably comprised of a deformable rubber insert, to form a compaction seal with the edge of the top of the stepped hole, in the same manner in which the conical section 100 forms a seal with shoulder 67. Other subsurface and top surface seal variations may be used, as described for the penetrator. Less preferably, the probe may be used without a top surface seal 94.

Preparing a stepped hole in the soil with an appropriate digging tool is preferred. Alternatively, the probe may be pushed into a straight sided hole having a diameter less than the diameter of the upper body, e.g., for probe 88, a hole having about 0.63 inch diameter. The conical part 100 of the probe will thus slightly compact the upper end of the hole as it passes along it, and upon full insertion there will be present a compaction seal at the conical section. For any probe, the hole depth may be made substantially greater than the probe overall length when it is desired to sample average gas composition over a range of depths or layers. It is possible in certain situations for the probe (and penetrators) to be simply pressed into the surface, to thereby create its own hole. This is undesired, since the soil generally will tend to be compacted where the perforated lower end is, inhibiting the desired gas flow into the probe.

In use, air to be sampled is drawn through the screened holes 96 of the probe lower body, through the hollow interior, and out the port 98 which connects to an analyzer G or other instrument having a device which creates a suction. Soil gas pressure may be measured when the instrument is not drawing gas from the soil.

The probe 42 and general methodology of measuring pressure and composition at the lower inlet and soil profile can also be employed with fields having pipe arrays 30, and treated with vacuum or pressure according to the prior art of the Benson and other patents. While a properly designed array of pipes will achieve effective pressure gradients and gas flows through the subsoils, it will not surprise that the results achieved in the profile will depend on time and may vary with location. For example, a sand bunker adjacent a golf green can significantly alter subsurface gas flow. Thus, the pressures and times at which a blower is operated can be determined by use of analyzers and probes, in the same manner as described above for the penetrators.

While the probe 88 is preferred other types of gas probes and other types of sensors may be used in the generality of other aspects of the invention. For instance, a small diameter needle may be inserted to a predetermined depth, particularly when ascertaining the gas composition within a narrow thickness horizon.

The dimensions of penetrators and probe given above are illustrative and will be varied from according to the character of the soil profile, where gas is desirably introduced or drawn, and other factors. And while the various devices have been described as circular, non-circular shapes may be used, in which case a reference to diameter herein shall be construed as a reference to the equivalent diameter. While a precisely formed stepped or other hole is most desirable, it will be appreciated that approximations of pre-formed holes are useful. The shaped holes formed for the invention are distinguished from holes which are essentially pits, or ones which have loose sloping sides, or ones which are irregular in lateral dimension, in that they nominally correspond with the penetrator lateral body dimensions at locations above the perforations.

The serial drawings of FIGS. 11–13 show the construction and use of a two part suction penetrator that makes repetitive treatments easier. The penetrator is comprised of bottom part 110 and an detachable top part 116. First, a hole 102 is cut into the surface of a typical soil profile 104 comprised of an upper turf layer 106 where the grass and roots are concentrated, typically, about 2 inch in depth. See FIG. 11. Thus, the plug 108 of turf layer is saved. As shown in FIG. 12, bottom part 110 is a hollow cylinder comprised of perforated metal having screened holes, or material of similar functionality, such as the bottom body parts previously described. It is inserted in the prepared hole and surrounded by permeable sand 112, so the part 110 projects somewhat above the elevation of the sand. A relatively impermeable layer 113 of hydrophilic colloidal clay, such as bentonite, is put around the top of the cylinder 110 which lacks holes and thus comprises the gas seal section of the penetrator. Water added to the bentonite on installation causes it to expand, thus forming an air seal between the top of cylinder 110 and the sidewall of the cylindrical hole. The bentonite expansion radially compacts the soil and prevents air from flowing downwardly around the cylinder when it is in use. When the time comes to withdraw gas from the soil, the separate top part 116 of the penetrator is slipped over the exposed end of the bottom part 110, so the parts connect by flexible rubber union 118. See FIG. 13. The top part 116 is dimensioned so that the plate and gasket of the top part rest on the surface of the turf layer 106, and thereby form a seal with the surface, as previously described. The plate and other features may be included or omitted, as previously described for other penetrators. When the two parts are connected, the port 115 of top 116 is connected to the inlet of a blower. With operation, gas will be drawn from the soil 117 below the elevation of seal 113, through the sand 112, through the bottom part 110, and up the interior of the penetrator to the blower.

When treatment is finished, the metal cup cover 114 is placed on top of the cylinder to close it off and to support the plug 108 which is reinserted in the hole to restore the surface, as indicated in FIG. 12.

Figure 14:
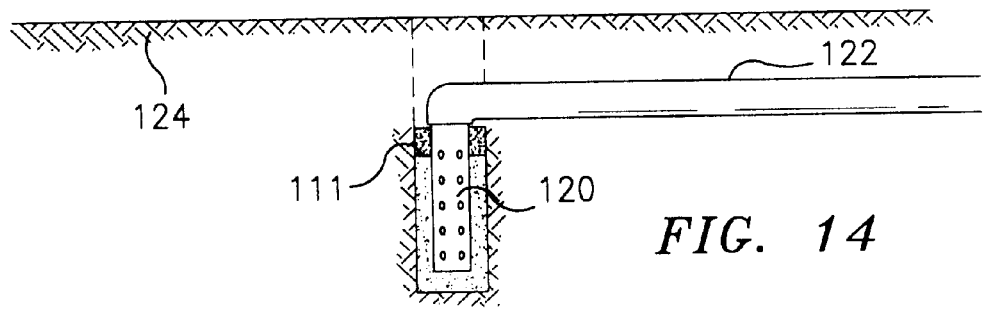
FIG. 14 shows a permanently installed vertical penetrator with its connecting subsurface pipe.

Of course, to reduce labor cost and periodic disruption, it is desirable to have piping or penetrators installed permanently. However, to install a Benson-type piping array means essentially rebuilding the field. Thus, a good alternative is to install one or more vertical penetrators permanently, on center-to-center spacing following the principles described above. As shown in FIG. 14, perforated body 120 is configured and installed similarly to the bottom part cylinder 110 described in connection with FIGS. 11–13, with a bentonite seal 111. It is then permanently connected to piping 122 which runs horizontally beneath the surface of the soil profile 124. The piping is installed by cutting and filling a narrow slit trench. Multiple penetrators are installed likewise. The piping, interconnecting any multiple penetrators according to engineering logic, runs underground to beyond the working surface of the field, to there emerge for connection to the inlet or outlet of a blower. A combination of one or more permanently installed penetrators and removable penetrators may be used for repetitive treatment of particular fields.

Figure 15:
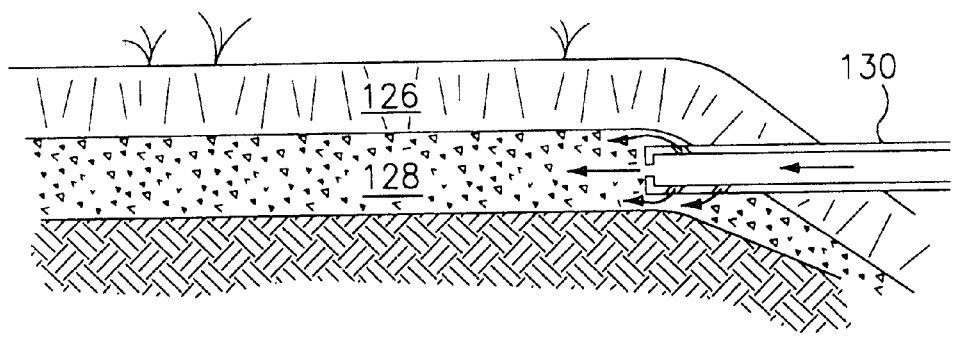
FIG. 15 shows how a horizontal penetrator exchanges air with a permeable layer.

The preferred penetrator inserts vertically, by which is meant that the probe inserts downwardly, perhaps at an incline, from the surface of the profile. FIG. 15 shows an alternative horizontal penetrator, used to introduce or remove gas from a profile having a suitably porous layer 128 which underlies a turf layer 126. Penetrator 130, connected to a source of positive or negative pressure penetrates a side slope of the field. As with vertical penetrators, multiple locations of horizontal penetrators may be used.

Figure 16:
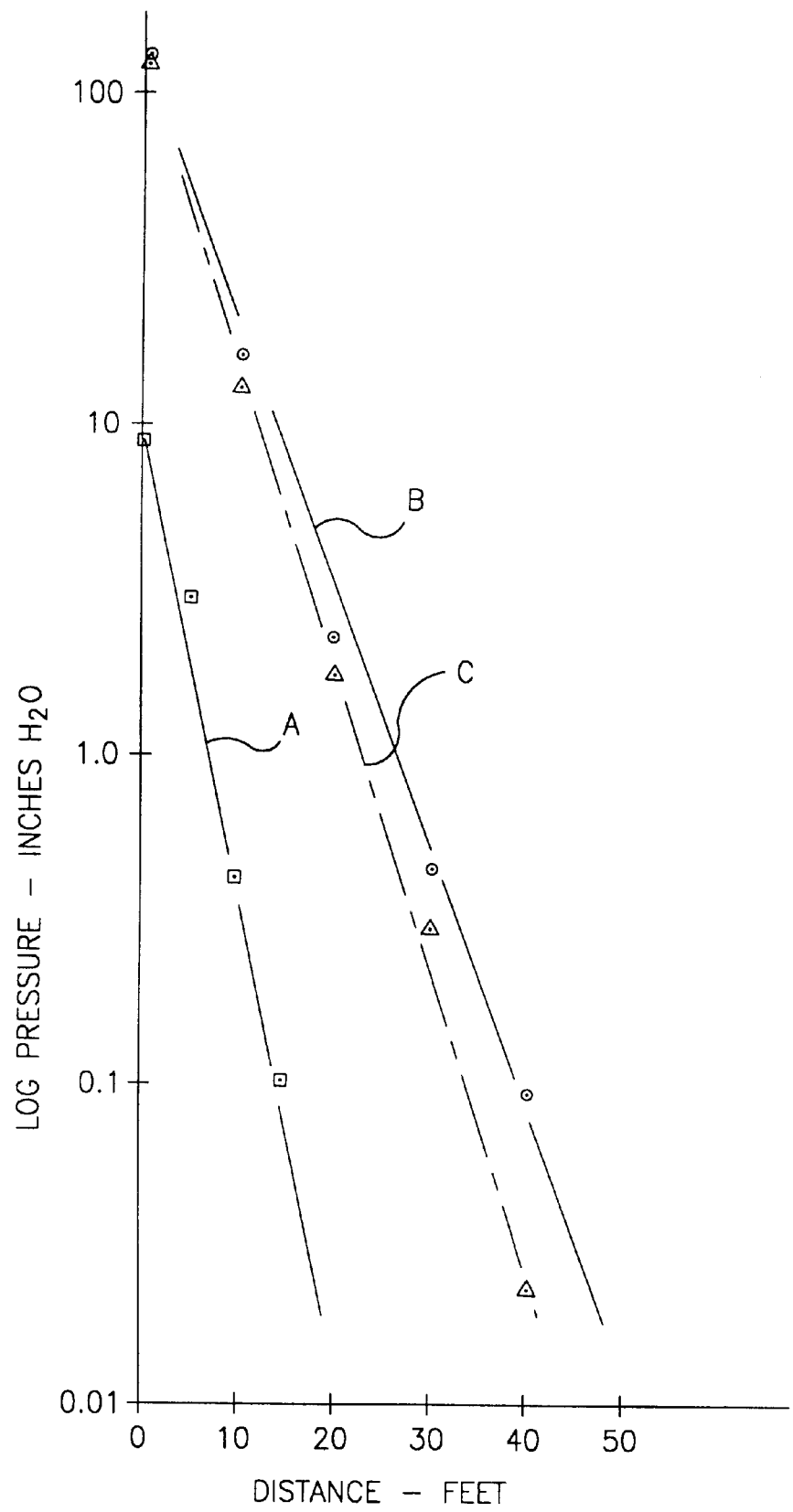
FIG. 16 is a graph showing how pressure varies with distance from a vertical penetrator, according to the soil character.

As an example of the effect on subsoil of a penetrator, vertically inserted in a soil profile at a certain point, representative data for different situations are presented in Table 1 and plotted on the semi-logarithmic graph of FIG. 16. The air flow, conventionally measured at the blower, was a function of the soil type as is indicated in the table (according to the Unified Soil Classification System). The penetrator was like that shown in FIG. 7. It had a 36 inch diameter metal plate with rubber gasket, and the nominal treatment layer T (See FIG. 7) extended from about 4 to 16 inches beneath the soil surface which was comprised of bent grass turf. Pressure was measured in the layer at about 4.5 to 7 inch deep using a preferred probe. No plastic membrane or other treatment of the turf surface was used.

Negative pressure was applied to two different permeability soils. The more permeable coarse-to-fine sand of Example B enabled substantially greater flow, and provided pressure effect at a substantially greater distance, than did fine sand and silt of Example A. Thus, to fully treat a field with Example A soil, substantially more penetrator holes would be made.

On the same type soil, comparing Example A with Example B, positive pressure produced a comparable scale effect to negative pressure. The decision on whether to use positive or negative pressure can thus depend on other factors, such as the extent to which positive water extraction is desired, or whether additives are to be added along with the air flow

TABLE 1

Subsurface Pressure Change with Radial Distance from Penetrator in Two Different Soil Types.

| Distance from penetrator - ft | Pressure - inches water column | | |
|---|---|---|---|
| | Example A | Example B | Example C |
| 0 | −98 | −158 | +151 |
| 5 | −3 | | |
| 10 | −0.4 | −18 | +14 |
| 15 | −0.09 | | |
| 20 | −0.01 | −2.2 | +1.7 |
| 25 | > −0.01 | | |
| 30 | | −0.42 | +0.28 |
| 40 | | −0.08 | +0.02 |
| 50 | | > −0.01 | <0.01 |
| Flow rate - Std. Cubic Feet/Minute: | 180 | 510 | 575 |
| Soil type: | Medium to Fine Sand and Silt, Trace of Clay | Coarse to Fine Sand Little Silt | | induced in the soil.

From the Table and FIG. 16, with the vertical penetrator of the invention, subsurface pressure changes sharply with distance, falling to levels of less than 0.01 inch water column at 20 to 40 feet or more from the penetrator. The graph thus shows how the a vertical penetrator at a central point creates a certain pressure distribution pattern in the soil profile, where for both pressure and suction, soil pressure p changes with radial distance d from the penetrator (or the zero point) according to the general relation $p=ce^{md}$, where c and m are constants, and where e is the base of the natural system of logarithms. This pressure distribution is distinct from one produced by one or more subterranean pipes lying parallel to the soil surface.

Although only the preferred embodiment has been described with some alternatives, it will be understood that further changes in form and detail may be made without departing from the spirit and scope of the claimed invention.

I claim:

1. A method of treating a soil profile to change the agricultural productivity thereof by changing the composition of the gas at a point within the soil profile, where said composition is different from the composition of atmospheric air, which comprises:
   (a) creating at a first location within said profile a gas pressure differential with the atmosphere above the soil, whereby gas is caused to flow through the soil profile, to thereby create a gas pressure differential with atmospheric pressure at said point, wherein the pressure differential at said point is less than the pressure differential at the first location;
   (b) measuring the composition of the gas at said point;
   (c) comparing the gas composition measured at said point to a desired reference gas composition; and,
   (d) controlling the duration of step (a) according to the degree to which the gas composition at said point approaches the reference gas composition, to thereby increase the fraction of gas constituents which enhance vegetative growth.

2. The method of claim 1 wherein the reference gas composition is the composition of said atmospheric air.

3. The method of claim 1 wherein the morphology of said soil profile comprises horizontal layers; wherein, said first location is within a first horizontal layer; wherein, said point is within a second horizontal layer, the second layer lying vertically above the first layer; and, wherein, gas is caused to flow vertically between the first and second layers and predominantly horizontally within said first layer.

4. The method of claim 1, wherein step (a) causes gas to flow radially within the soil profile with respect to said first location, to thereby create within a given layer of the soil profile a radial pressure gradient p in the form of $$p = ce^{md}$$

where d is distance from the first location, c and m are constants, and e is the base of the natural logarithm.

5. The method of claim 1 wherein step (b) comprises measuring the amount of a gas constituent selected from the group consisting of water vapor, oxygen, carbon dioxide, methane, and hydrogen sulfide.

6. The method of claim 5 wherein said degree is sufficient to cause the composition of the gas at said point to become comprised of constituents which are by weight percent 19–21 oxygen, less than 2 carbon dioxide, less than 1 methane, and less than 0.005 hydrogen sulfide; wherein, the composition of gas at said point at the time of initiation of step (a) is characterized by having at least one of the constituents outside said weight percent limits.

7. A method of treating a soil profile having a surface exposed to atmospheric air to improve its agricultural productivity, wherein the gas composition within the soil profile is different from the composition of atmospheric air, by creating within the soil profile a pressure gradient sufficient to lessen the compositional difference of the gas within the soil profile from atmospheric air, which comprises:

(a) inserting at least a portion of a penetrator beneath the surface of the soil profile at a first location; wherein, the penetrator has a body with a hollow interior and at least one passageway connecting the hollow interior with the penetrator exterior where the penetrator is beneath said surface;

(b) creating a gas pressure differential between the hollow interior of the penetrator and the atmospheric air, to thereby cause gas to flow through said at least one passageway and through the soil profile, to thereby create a first horizontal pressure gradient within the soil profile;

(c) measuring the pressure of the gas beneath the surface of the soil profile at one or more locations spaced apart from said first location, to determine a point where the pressure is insignificantly different from atmospheric pressure, insofar as causing flow of air from atmosphere into the soil profile by an amount sufficient to significantly change the composition of the gas within the soil, to thereby increase the fraction of gas constituents which enhance vegetative growth at said points;

(d) performing said step (a) at a second location spaced apart from said first location; and, (e) creating a gas pressure differential between the hollow interior of the penetrator and the atmospheric air above the soil profile, to thereby cause gas to flow through said at least one passageway and through the soil profile, to thereby create a second horizontal pressure gradient within the soil profile; wherein the second horizontal pressure gradient creates a pressure at said point which is significantly different from atmospheric pressure.

8. The method of claim 7 characterized by creating a gas pressure within the interior of the penetrator which is less than the pressure of atmospheric air above the surface of the soil profile, to thereby cause flow of atmospheric air into the surface of the soil profile, and then laterally through the soil profile toward the penetrator.

9. The method of claim 7 characterized by creating a gas pressure within the interior of the penetrator which is greater than the pressure of atmospheric air above the surface of the soil profile, to thereby cause flow of gas through the soil profile laterally away from the penetrator and then through the surface of the soil profile and into the atmosphere above.

10. A method of treating a soil profile having a lateral surface exposed to atmospheric air to improve its agricultural productivity, wherein the gas composition within the Boil profile is different from the composition of atmospheric air, by creating within the soil profile a pressure gradient sufficient to lessen the compositional difference of the gas within the soil profile from atmospheric air, which comprises:

(a) forming a shaped hole having a sidewall within soil profile, the hole having an opening at the surface of the soil profile;

(b) inserting a penetrator into the shaped hole from the surface; the penetrator having a body with a hollow interior, at least one passageway connecting the hollow interior to the penetrator exterior where it is beneath the surface of the soil, and a seal section on the exterior of the penetrator vertically above any said at least one passageway, the seal section sized to nominally fit a portion of the shaped hole;

(c) forming a first gas seal between the penetrator seal section and the sidewall of the hole by compacting with said seal section a portion of the soil profile at the sidewall of the shaped hole during the vertical inserting step (b);

(d) creating a gas pressure differential between the interior of the penetrator and the atmosphere above the soil profile, to thereby cause gas to flow through said passageway and into the soil profile, to thereby increase the fraction of gas constituents which enhance vegetative growth at said point.

11. The method of claim 10 characterized by creating within the penetrator interior a pressure which is less than atmospheric pressure.

12. The method of claim 11 wherein the penetrator body is cylindrical and comprised of an upper body portion of a first diameter and a lower body portion of a second diameter which is smaller than the first diameter, the upper body portion and lower body portion connected by the seal section.

13. The method of claim 12 which further comprises: forming a shaped hole which is round, the hole having a sidewall with an upper portion of a first diameter, a lower portion of a second diameter which is smaller than the first diameter, and a shoulder portion therebetween; the hole first and second diameters generally corresponding with said penetrator body first and second diameters; wherein, the shoulder portion is compacted by the penetrator seal section during step (b).

14. The method of claim 10, wherein the penetrator body has a second seal section positioned vertically above said first seal section, further comprising: forming a second seal between the surface of the soil profile and said second seal section during step (b).

15. The method of claim 14 wherein said second seal section comprises a plate; and, wherein, said second seal is formed by pressing the plate toward the surface of the soil profile.

16. The method of claim 15 characterized by placing a membrane on the surface of the soil profile around at least a portion of the plate, to seal at least a portion of the surface of the soil profile.

17. The method of claim 10 wherein the first gas seal section is comprised of an expansible device surrounding the penetrator body, which further comprises expanding said expansible device to form said first gas seal.

18. A method of efficiently treating a soil profile having a surface exposed to atmospheric air to change its permeability and agricultural productivity, wherein the gas composition within the soil profile is different from the composition of atmospheric air, and wherein the soil profile is comprised of one or more permeable horizontal layers, by creating within the soil profile a pressure sufficient to change the permeability of the gas within the soil profile, which comprises:
  (a) forming a shaped hole within the soil profile, the hole having an opening at said surface;
  (b) vertically inserting a penetrator into the shaped hole from the surface; the penetrator having a body with a hollow interior, at least one passageway connecting the hollow interior to the penetrator exterior where it is beneath the surface of the soil, and a seal section on the exterior of the penetrator vertically above any said at least one passageway; said seal section comprising a plate extending radially from the penetrator body, the plate underlaid with a compressible material where it contacts the surface of the soil; to form a first gas seal between the penetrator seal section and the surface of the soil profile;
  (c) raising the gas pressure within the interior of the penetrator to above atmospheric pressure, to thereby cause gas to flow through said passageway and into a layer of the soil profile, sufficient to increase the permeability of said layer.

19. The method of claim 18 which further comprises: (d) lowering and then alternately raising the gas pressure within the interior of the penetrator, to thereby create pulsating pressure and flow within said layer.

20. The method of claim 19 which further comprises: (d) entraining a granular medium in the gas which is caused to flow into the soil profile in combination with step (c), to inject the medium within said layer.

21. A method of treating a soil profile comprised of two or more layers of differing composition or structure and having a surface exposed to atmospheric air to change agricultural productivity thereof, wherein the gas composition within the soil profile is different from the composition of atmospheric air, by creating within the soil profile a pressure gradient sufficient to lessen the compositional difference of the gas within the soil profile from atmospheric air, which comprises:
  (a) forming a hole having a sidewall in the surface of the soil profile;
  (b) placing a penetrator in the hole, wherein the penetrator has a body with a hollow interior and at least one passageway connecting the hollow interior to the penetrator exterior where it is beneath the surface of the soil, at the elevation of one or more of the layers;
  (c) forming a gas seal between the penetrator body and the hole sidewall at a location vertically above any said passageway;
  (d) connecting the hollow interior of the penetrator to piping running generally horizontally beneath the surface of the soil profile; and,
  (e) creating within the penetrator interior a gas pressure differential between the interior of the penetrator and the atmosphere above the soil profile by connecting said piping to a means for moving air, thereby causing gas flow along a path which lie the penetrator interior, said at least one passageway, and said one or more layers, to thereby increase the fraction of gas constituents which enhance vegetative growth within the soil profile.

22. The method of claim 21 which comprises the further step: (f) placing an expansible hydrophilic clay within the hole when forming the first gas seal.

23. A method of treating a soil profile comprised of layers of differing structure and having a surface exposed to atmospheric air, to change its agricultural productivity, wherein the gas composition within the soil profile is different from the composition of atmospheric air, by creating within the Soil profile a pressure gradient sufficient to lessen the compositional difference of the gas within the soil profile from atmospheric air, which comprises;
  (a) providing a penetrator comprised of two disconnectable body parts, the first body part comprising an interior cavity, passageway means for connecting the interior cavity with the exterior of the first body part, and means for coupling the first body part with a second body part; and, a second body part comprising an interior cavity, means for coupling the second body part to the first body part and means for connecting the second body part cavity to a source of differential gas pressure; wherein when the two body parts are connected by said respective means for coupling the interior cavities of the two body parts are in communication;
  (b) forming a shaped vertical hole having a sidewall in the soil profile by steps which comprise removing a plug of turf;
  (c) inserting the first penetrator body part into the surface of the soil profile and forming a first air seal with the sidewall of the hole at an elevation vertically above said passageway means, wherein said means for coupling to the second body part is exposed within the hole at an elevation lower than the Surface of the soil profile;
  (d) inserting the second body part into the hole and connecting the second body part with the first body part by said respective means for coupling;
  (e) creating a gas pressure differential between the interior cavity of said second body part and the atmosphere above the soil profile, to thereby cause gas to flow through said second body part, said first body part, said passageway in the first body part, and the soil profile, to thereby increase the fraction of gas constituents which enhance vegetative growth within the soil profile;
  (f) terminating said differential pressure and thereby said flow of gas;
  (g) disconnecting the second body part from the first body part, and removing the second body part from the hole while leaving the first body part within the hole;
  (h) inserting a plug into the hole, to cover over the first body part and thereby restore the surface of the soil profile; and,
  (i) subsequently removing the plug and repeating the steps (d) through (h).

24. A device, for use in adding or removing gases from a soil profile, adapted for insertion vertically downward into a hole in the surface of the soil profile, comprising:

a hollow upper body portion, having a first outside diameter, a port for connection to a source of gas pressure different from atmospheric pressure, and a first gas seal section adapted for forming a gas seal between the body portion and the soil profile in vicinity of the surface of the soil profile;

a hollow lower body portion, having a second outside diameter which is smaller than said first diameter, and having at least one passageway connecting the hollow interior of the lower body portion with the exterior thereof; and, a hollow center section, connecting the upper body portion and lower body portion, having means for forming a second gas seal between the center section and the wall of the hole in the soil profile;

wherein, when the device is inserted into the hole, the first gas seal section forms a gas seal in vicinity of the surface and the second gas seal forms a gas seal at a location within the hole which is spaced apart from said vicinity of the surface of the soil profile.

25. The device of claim 24 wherein the first gas seal section is a conical section and wherein the second gas seal section is a plate.

* * * * *